(12) United States Patent
Zhang

(10) Patent No.: US 9,190,089 B1
(45) Date of Patent: Nov. 17, 2015

(54) AIR BEARING AREA CONFIGURATION FOR CONTAMINATING PARTICLE REMOVAL

(71) Applicant: Western Digital (Fremont), LLC, Fremont, CA (US)

(72) Inventor: Shuyu Zhang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/582,921

(22) Filed: Dec. 24, 2014

(51) Int. Cl.
*G11B 5/60* (2006.01)

(52) U.S. Cl.
CPC .................................. *G11B 5/6082* (2013.01)

(58) Field of Classification Search
CPC ........................................................ G11B 5/60
USPC ...................................................... 360/236.4
See application file for complete search history.

(56) References Cited

U.S. PATENT DOCUMENTS

| | | | |
|---|---|---|---|
| 5,917,679 A * | 6/1999 | Park et al. ................ | 360/235.6 |
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,583,953 B1 | 6/2003 | Han et al. | |
| 6,646,832 B2 | 11/2003 | Anaya-Dufresne et al. | |
| 6,661,612 B1 | 12/2003 | Peng | |
| 6,665,146 B2 | 12/2003 | Hawwa et al. | |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |
| 6,721,142 B1 | 4/2004 | Meyer et al. | |
| 6,744,599 B1 | 6/2004 | Peng et al. | |
| 6,771,468 B1 | 8/2004 | Levi et al. | |
| 6,796,018 B1 | 9/2004 | Thornton | |
| 6,801,402 B1 | 10/2004 | Subrahmanyam et al. | |
| 6,809,904 B2 | 10/2004 | Boutaghou et al. | |
| 6,856,489 B2 | 2/2005 | Hawwa et al. | |

(Continued)

*Primary Examiner* — Mark Blouin

(57) ABSTRACT

A disk drive for redirecting contaminating particulate matter away from an area bearing of a slider element. At least two etched channels are provided in the slider element of the disk drive. The at least two etched channels direct incoming air flow to a leading edge of the slider element from the leading edge towards respective sides of the slider element. Particulate matter that may be progressing towards the air bearing are redirected by virtue of the incoming air flow to the leading edge and expelled from the air bearing via the at least two etched channels.

15 Claims, 10 Drawing Sheets

(56) References Cited

U.S. PATENT DOCUMENTS

| | | |
|---|---|---|
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,583,473 B2 | 9/2009 | Bolasna et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,760,468 B2 | 7/2010 | Cha et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,116,037 B2 | 2/2012 | Kohira et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,279,556 B2 * | 10/2012 | Ruiz .................. 360/234 |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,427,784 B2 * | 4/2013 | Sonoda .................. 360/235.7 |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,493,688 B2 * | 7/2013 | Ambekar et al. .......... 360/236.2 |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2013/0244541 A1 | 9/2013 | Yaemglin et al. |
| 2013/0293982 A1 | 11/2013 | Huber |

* cited by examiner

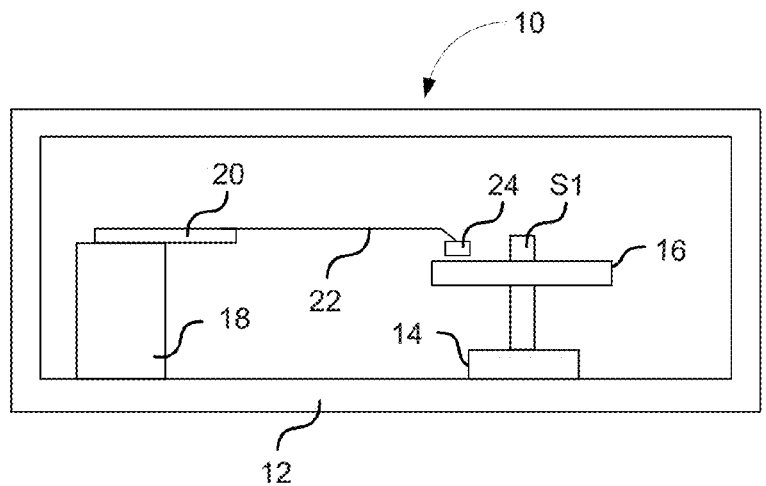
FIG. 1A
(Conventional)
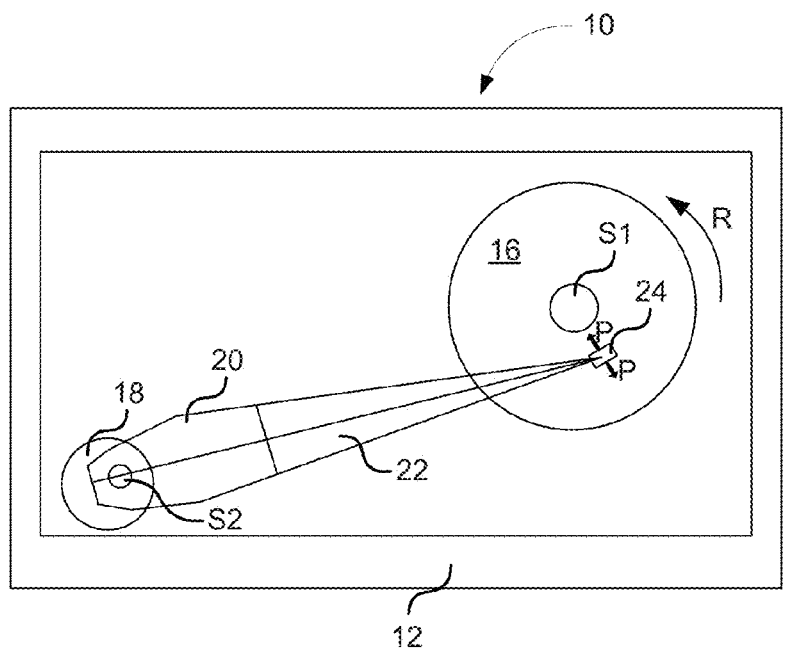
FIG. 1B
(Conventional)

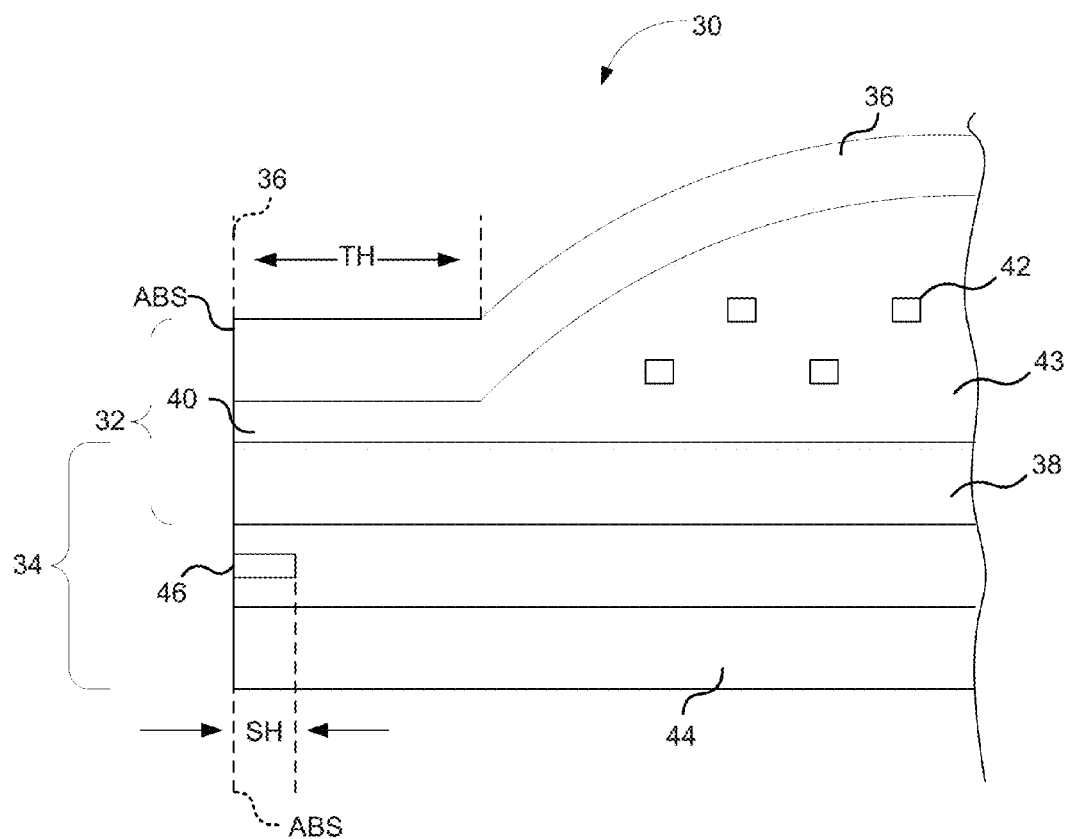
FIG. 1C
(Conventional)

AIR BEARING AREA CONFIGURATION FOR CONTAMINATING PARTICLE REMOVAL

BACKGROUND

In magnetic storage devices such as hard disk drives (HDD), read and write heads are used to magnetically read and write information to and from the storage media. In an HDD, data is stored on one or more disks in a series of adjacent concentric circles. An HDD comprises a rotary actuator, a suspension mounted on an arm of the rotary actuator, and a slider bonded to the suspension to form a head gimbal assembly. In a traditional HDD, the slider carries a read/write head, and radially floats over the recording surface of the disk under the control of a servo control system that selectively position the head over a specific track of the disk.

BRIEF DESCRIPTION OF THE DRAWINGS

Various embodiments are illustrated by way of example, and not limitation, in the figures of the accompanying drawings in which:

FIGS. 1A and 1B illustrate an example of a conventional magnetic disk drive in which a magnetic read element manufactured in accordance with various embodiments may be utilized;

FIG. 1C illustrates an example of a conventional read/write head;

DETAILED DESCRIPTION

Figure 2:
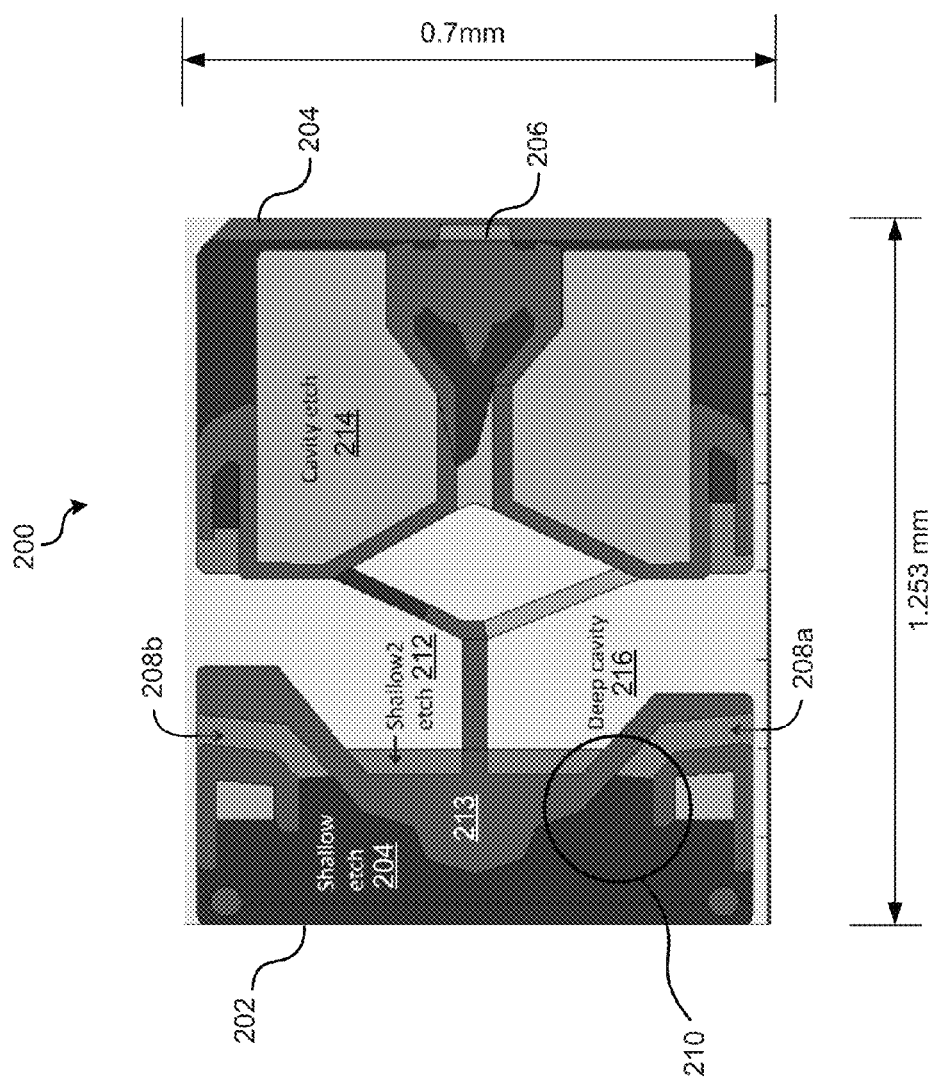
FIG. 2 illustrates a bottom view of an example magnetic read/write head configured with particulate removal features in accordance with various embodiments of the present disclosure.

In the following description, numerous specific details are set forth to provide a thorough understanding of various embodiments of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

As described above, magnetic storage devices such as HDDs use magnetic media to store data and a movable slider having magnetic transducers positioned over the magnetic media to selectively read data from and write data to the magnetic media. The movable slider and magnetic transducers may be a sub-component of a head gimbal assembly (HGA). A magnetic transducer typically comprises a magneto-resistive read element (e.g., a so-called giant magneto-resistive read element, or a tunneling magneto-resistive read element) and an inductive write structure comprising a flat coil deposited by photolithography and a yoke structure having pole tips that face a disk media.

FIGS. 1A and 1B illustrate an example magnetic disk drive 10 that can include a sealed enclosure 12, a disk drive motor 14, a magnetic disk 16, supported for rotation by a spindle S1 of motor 14, an actuator 18 and an arm 20 attached to a spindle S2 of actuator 18. Suspension 22 is coupled at one end to arm 20, and at its other end to a read/write head or transducer 24. Transducer 24 typically includes an inductive write element with a magneto-resistive read element (shown in FIG. 1C). As motor 14 rotates magnetic disk 16, as indicated by arrow R, an air bearing is formed between an air bearing surface (ABS) of transducer 24 and a surface of magnetic disk 16 causing transducer 24 to lift slightly off of the surface of magnetic disk 16, or, as it is termed in the art, to "fly" above magnetic disk 16. Various magnetic "tracks" of information can be read from magnetic disk 16 as actuator 18 causes transducer 24 to pivot in a short arc as indicated by arrows P.

FIG. 1C illustrates a magnetic read/write head 30 including a write element 32 and read element 34. The edges of write element 32 and read element 34 also define an ABS in a plane which flies above the surface of the magnetic disk 16 during operation.

Read element 34 includes a first shield 44, an intermediate layer 38 which serves as a second shield, and a read sensor 46 located between the first shield 44 and the intermediate layer 38. Read sensor 46 has a particular stripe height and a particular location between the first shield 44 and the second shield 38, both of which are chosen to attain a particular read performance. Control of stripe height is important in controlling device resistance, device output amplitude, device bias point and consequently many related measures of performance. Magneto-resistive sensors can be used with a variety of stripe heights, with a typical stripe height being smaller than about 2 microns, including much less than 1 micron. Further, although read sensor 46 is shown in FIG. 1C as a shielded single-element vertical read sensor, read element 34 can take a variety of forms as is known to those skilled in the art, such as unshielded read sensors.

Write element 32 is typically an inductive write element including the intermediate layer 38 which serves as a first yoke element or pole, and a second yoke element or pole 36, defining a write gap 40 therebetween. First yoke element 38 and second yoke element 36 are configured and arranged relative to each other such that the write gap 40 has a particular nose length, NL. Also included in write element 32, is a conductive coil 42 that is positioned within a dielectric medium 43. As is well known to those skilled in the art, these elements operate to magnetically write data on a magnetic medium such as a magnetic disk 16.

The flying height (FH), which can refer to the aforementioned air bearing space between media (e.g., magnetic disk 16) and the magnetic read/write head 30 (of a transducer) on a slider, is a key parameter that affects the performance of a magnetic storage device. Accordingly, a nominal FH is typically chosen to be a careful compromise between extremes in a classic engineering "trade-off." Decreasing the FH is advantageous because an FH that is too high degrades the ability of the transducer to write and/or read information to/from the surface of the media/disk surface. Therefore, reductions in FH can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level.

Because of the desire to reduce FH, the air bearing between the media and magnetic read/write head is quite thin and therefore, very susceptible to unwanted effects resulting from the introduction of any type of contaminate, such as particulate matter/particles that can become trapped in the air bearing. For example, a magnetic read/write head can be mounted on a slider that flies a mere 10 nm (an approximate example) over the media. Any particulate matter trapped within this very thin air bearing can create a variety of problems including, but not limited to the following: abrasive wear on the media/disk surface; magnetic spacing modulation; unstable flying conditions; and in extreme cases, crashing of the slider onto the media/disk surface.

Thus, one challenge that disk drive engineers face involves removing or preventing the entry of any particulate matter that is introduced into the air bearing so as to constantly maintain the desired nominal FH and reduce the risk of any particle-caused failures. Certain methods that have been developed in an attempt to reduce particle contamination in the air bearing have been directed at "blocking" particles from entering the air bearing, such as using a fence at a leading edge of the slider to block particles from entering the air bearing. Other methods include a particle trap design using deep pits in the leading area of the slider to trap particles that have already entered the air bearing.

However, the aforementioned methods can have a negative impact on the performance of the HDD due to incoming air flow that can also be blocked or trapped using such structures. That is, and as the radial position of the magnetic read/write head changes (through, e.g., the inner diameter (ID), outer diameter (OD), and middle diameter (MD)), the relative velocity of the disk surface due to disk rotation also changes. Specifically, the relative velocity of the disk surface increases with increasing radius. Furthermore, as the radial position of the magnetic read/write head changes, the relative direction of incoming air flow changes. Specifically, in magnetic storage drives that utilize a rotary actuator (or a linear actuator having a line of action that does not pass through the disk center) the skew of the slider will change as the actuator changes its radial position relative to the disk surface. As the skew of the slider changes, the direction of incoming air flow relative to the slider changes accordingly, also tending to change the FH, which can be referred to as the "skew effect" on FH.

Accordingly, various embodiments of the present disclosure are directed to one or more structural ABS features that can redirect any particulate matter that may find its way into the air bearing. In particular, air flow within the air bearing can be used to displace any particles from the air bearing to reduce the reliability problems induced by particle contamination, where the one or more structural ABS features can direct incoming airflow into specified flow patterns. Additionally, various embodiments of the present disclosure are effective at redirecting particulate matter at any relative radial location/position of the media, e.g., at the ID, OD, and MD. Ultimately, the particulate matter can be directed/redirected to exit the air bearing or air bearing surface via the one or more structural ABS features.

FIG. 2 is a bottom view of an example slider 200 configured in accordance with various embodiments to effectuate the redirection and/or displacement of particulate from the air bearing surface. Slider 200 can be configured to have a leading edge 202 and a trailing edge 204. Moreover, slider 200 has a transducer 206 proximate to/at the trailing edge 204. The bottom surface of slider 200 makes up an ABS, where the various shaded areas of the bottom surface of slider 200 are indicative of areas that have been etched at various depths resulting in different cavities, steps, and/or pads.

Additionally, slider 200 may include two etched channels 208a and 208b in the leading area of an air bearing, one leading to the ID side of the media/disk surface (208a) and another leading to the OD side of the media/disk surface (208b). Relatively wide open inlets (one of which is shown as area 210) can lead into both channels 280a and 208b. These inlets face the incoming flow of air and step into deeper recessions toward the outlets of channels 208a and 208b (at both ID and OD sides, respectively). A fence or wall area 213 can be implemented in slider 200 to assist in directing the air flow to channels 208a and 208b.

In accordance with one embodiment, etched channels 208a and 208b may each have a width approximately between 0.04 to 0.1 µm to allow any particles sized 0.1 µm or less passage through etched channels 208a and 208b. For example, particles that are greater than 0.1 µm may be too large such that they no longer "float" into the air bearing, and according need not be redirected via etched channels 208a and 208b. However, other embodiments contemplate the use of etched channels 208a and 208b having alternative widths. Moreover, etched channels 208a and 208b need not have the same dimensions (e.g., width, length, depth, etc.) to accommodate differing scenarios, redirecting different sized particulate matter, to effectuate improved particle redirection efficiency at different locations of the media (e.g., at the ID, OD, and MD). It should be noted however, that as will be described below and as illustrated in the accompanying figures, the air flow at any location of the media tends to redirect airflow outwards and away from the air bearing of slider 200 due to etched channels 208a and 208b.

Again, the various shaded areas of the bottom surface of slider 200 are indicative of areas that have been etched at various depths resulting in different cavities, steps, and/or pads. In the example illustrated in FIG. 2, slider 200 employs different recessed/etched areas, the depths of which (from shallowest to deepest) are as follows: 1) 0.1-0.2 µm for shallow etch area 204; 0.4-1.0 µm for shallow2 etch area 212; 0.6-2 µm for cavity etch 214; and 1-3 µm for deep cavity etch area 216 (which is a combination of the depths of the cavity etch area 214 and the shallow etch2 area 212). It should be noted that the etch depth of channels 208a and 208b can be the same as that of the shallow2 etch area 212 of slider 200. This shallow2 etch area 212 can be used during or for manufacturing, e.g., for mask alignment when etching slider 200. Additionally, shallow2 etch area 212 can create a step into deep cavity etch area 216 for a less abrupt drop/wall. It should be noted that in some embodiments, the particle-directing or redirecting effect of etched channels 208a and 208b can be enhanced by a deeper cavity etch depth in these channels (e.g., to allow for increased air flow for particular redirection away from the ABS of slider 200).

It should be noted that depth measurements provided herein refer to depth, e.g., of a cavity or other etched surface or area relative to the lowest surface of the slider. As would be understood by those of ordinary skill in the art, the lowest surface of a slider that flies over a recording medium is that which is nearest the recording medium. In other words, FIG. 2 (in addition to other representations of a slider) illustrates bottom views that are upside down.

It should be noted that sliders may have varying dimensions. For example, a "Pemto" type slider design may generally refer to a slider having the following dimensions: approximately 1.25 mm long, approximately 0.7 mm wide, and approximately 0.23 mm thick, although some manufacturers due to particular manufacturing requirements may configure a Pemto type slider to be, e.g., approximately 1.35 mm long. A "Femto" type slider may generally refer to a slider having the following dimensions: approximately 0.85 mm long, approximately 0.7 mm wide, and approximately 0.23 mm thick. In accordance with one example, slider 200 may be a Pemto type ABS slider design, where the length of slider 200 is approximately 1.253 mm, the width is approximately 0.7 mm, and the thickness at its largest (shallowest etched area(s)) is approximately 0.23 mm. In accordance with another example, slider 200 may be a Femto type ABS slider design, where one or more dimensions of slider 200 and/or one or more elements of slider 200 may be decreased. For example, and as discussed above, the length of a Femto type ABS slider configured in accordance with another example may be about 0.85 mm, the width may be about 0.7 mm, and the thickness at its largest (shallowest etched area(s)) may be about 0.23 mm.

Figure 3A:
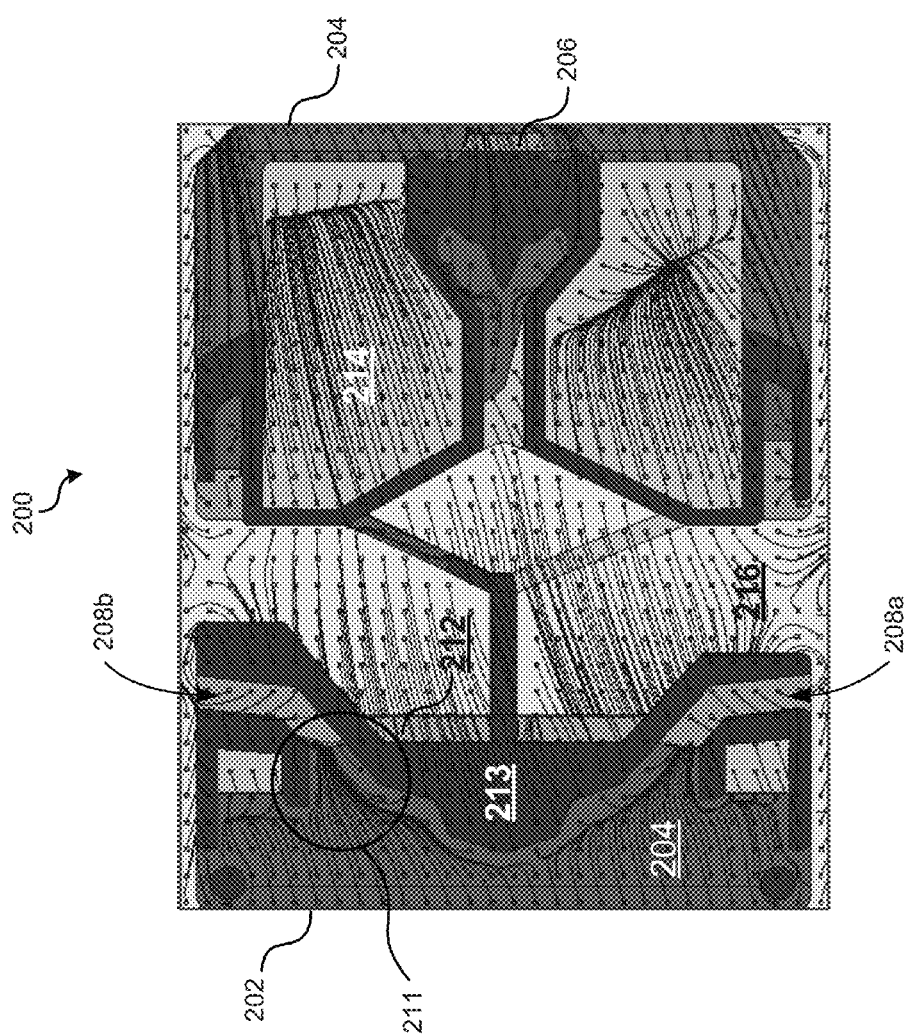
FIG. 3A illustrates an example of inner diameter air flow along the bottom of the example magnetic read/write head of FIG. 2.
Figure 3B:
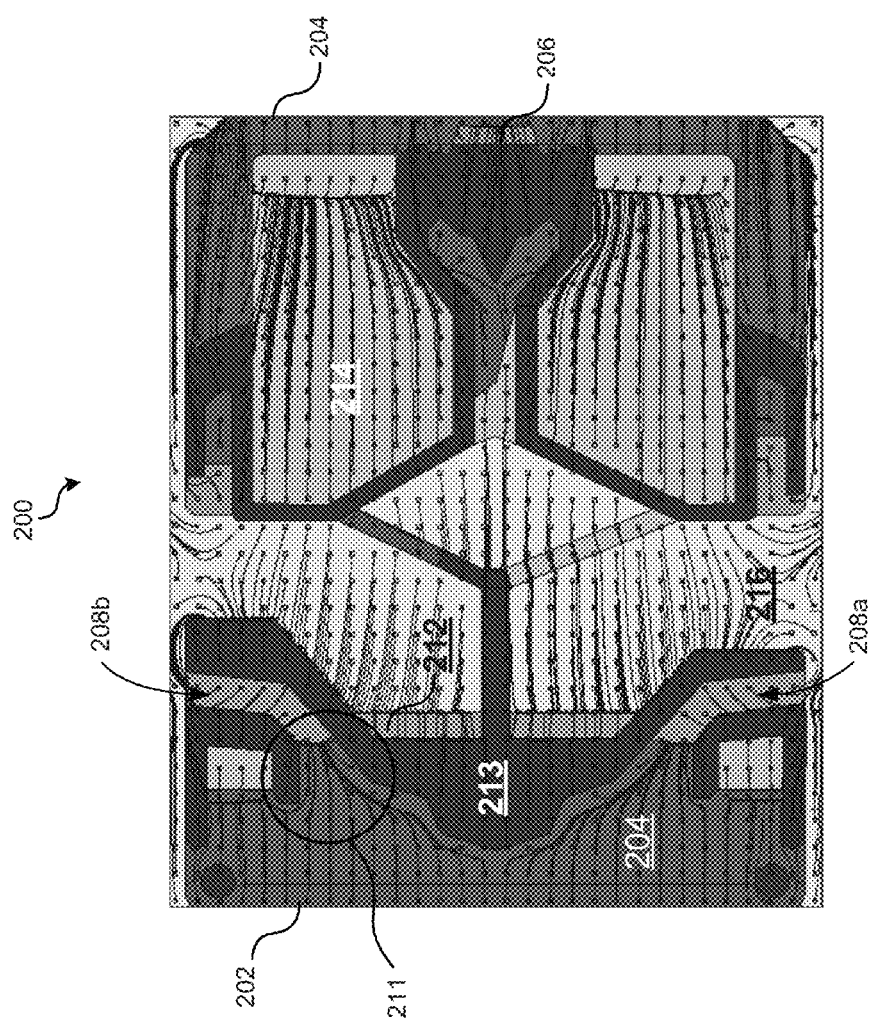
FIG. 3B illustrates an example of middle diameter air flow along the bottom of the example magnetic read/write head of FIG. 2.
Figure 3C:
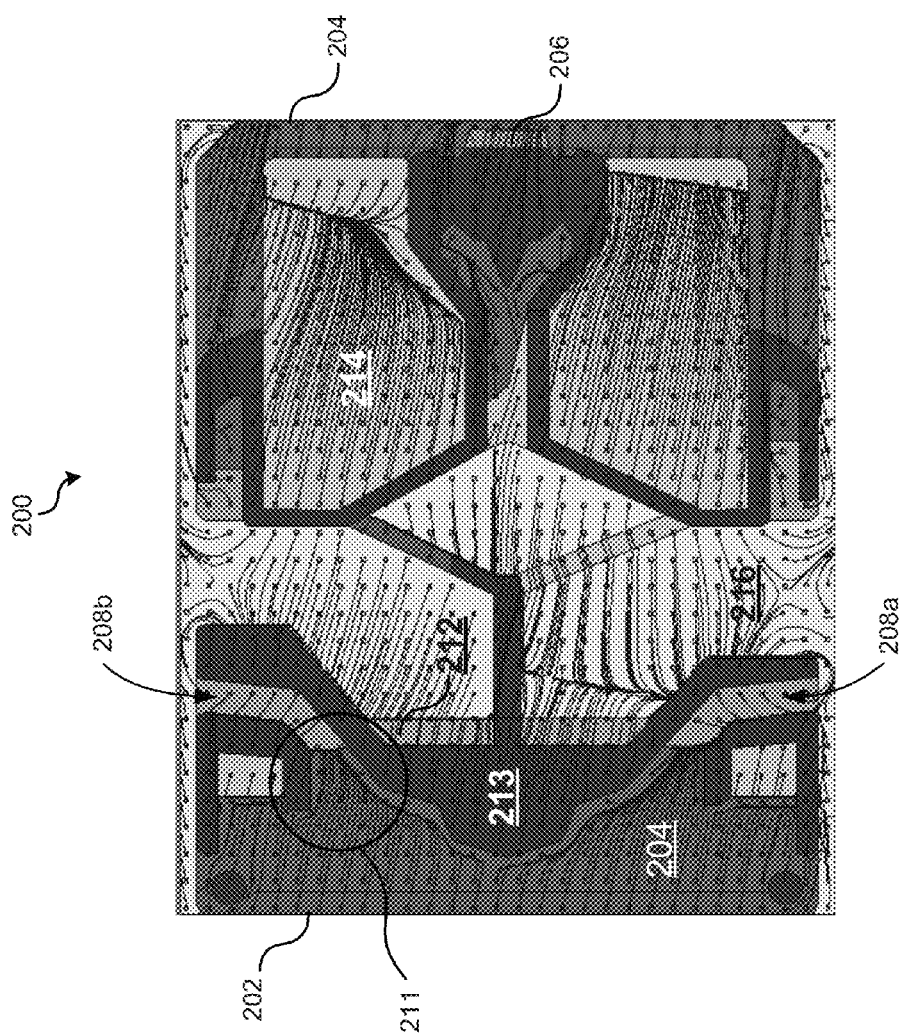
FIG. 3C illustrates an example of outer diameter air flow along the bottom of the example magnetic read/write head of FIG. 2.

FIGS. 3A-3C illustrate air flow patterns in the air bearing of slider 200 in various positions relative to the media/disk surface, in particular, the ID, the MD, and the OD. FIG. 3A illustrates the air flow patterns at the ID within the air bearing of slider 200. FIG. 3B illustrates the air flow patterns at the MD within the air bearing of slider 200. FIG. 3C illustrates the air flow patterns at the OD within the air bearing of slider 200. As can be appreciated, the directions of streamlines at all locations of the slider 200 (relative to the media/disk surface) tends to direct air flow towards from the leading area of slider 200 and into the two channels 208a and 208b). As a result, particles caught in these air flow patterns will commensurately pass through the channels 208a and 208b, and ultimately pass outside of the perimeter of the air bearing.

Figure 4A:
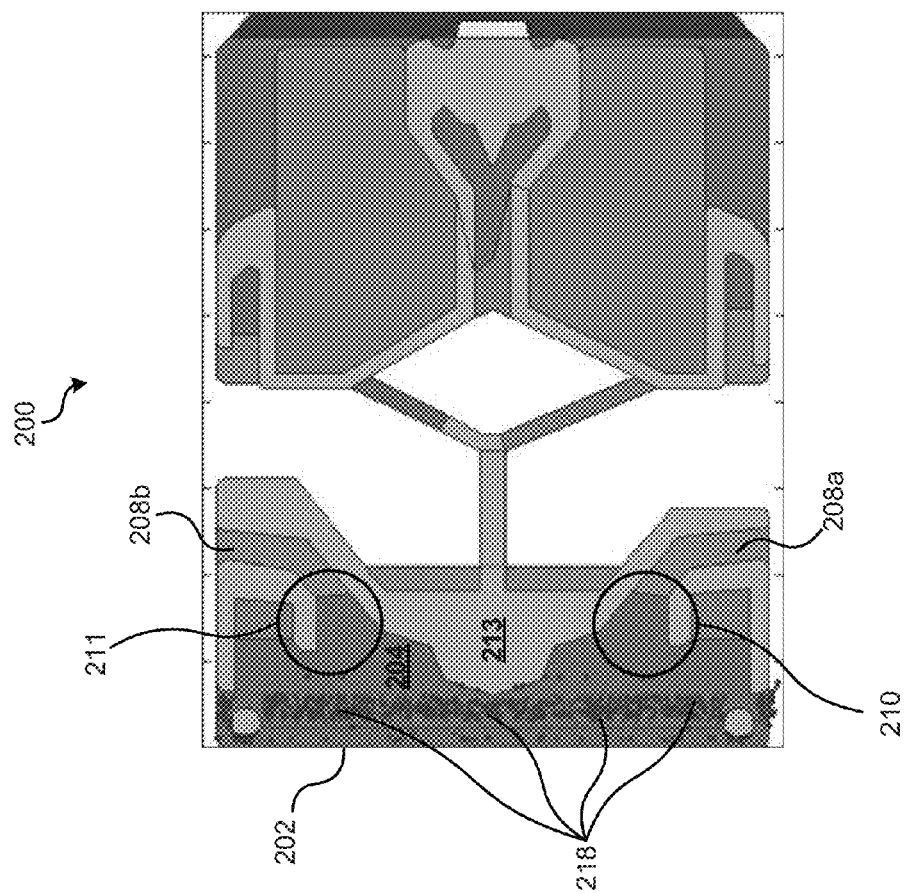
FIG. 4A illustrates a first example progression of particulate flow from a bottom view perspective of the magnetic read/write head of FIG. 2.
Figure 4B:
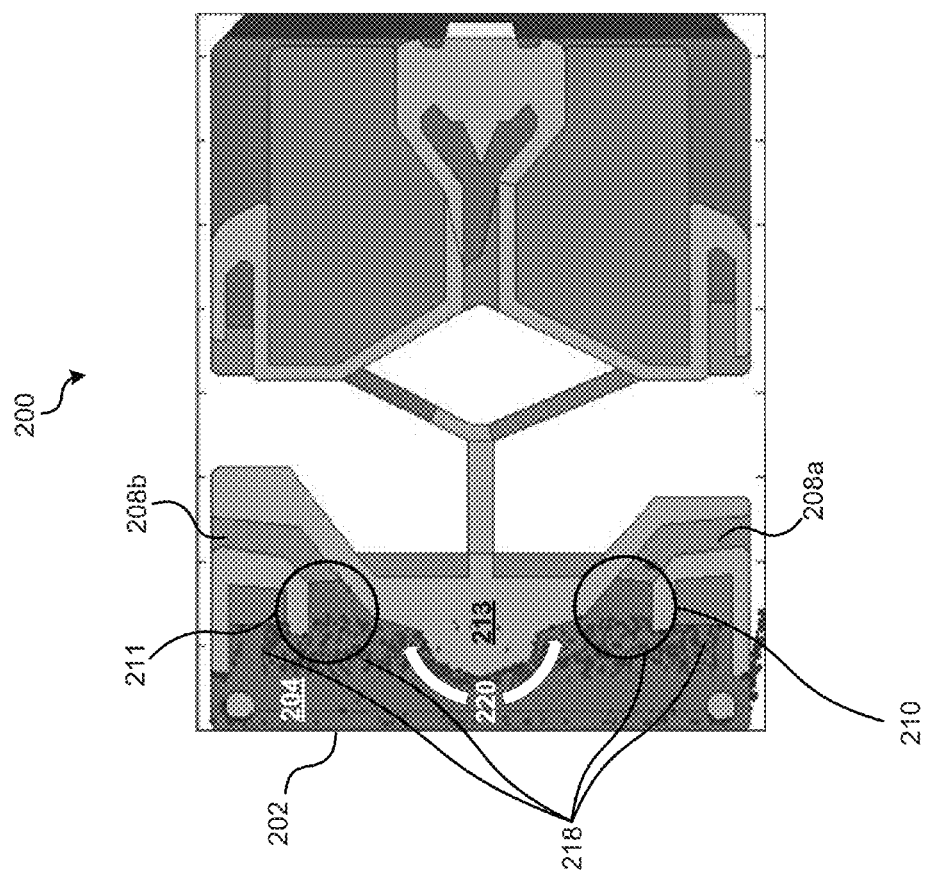
FIG. 4B illustrates a second example progression of particulate flow from a bottom view perspective of the magnetic read/write head of FIG. 2.
Figure 4C:
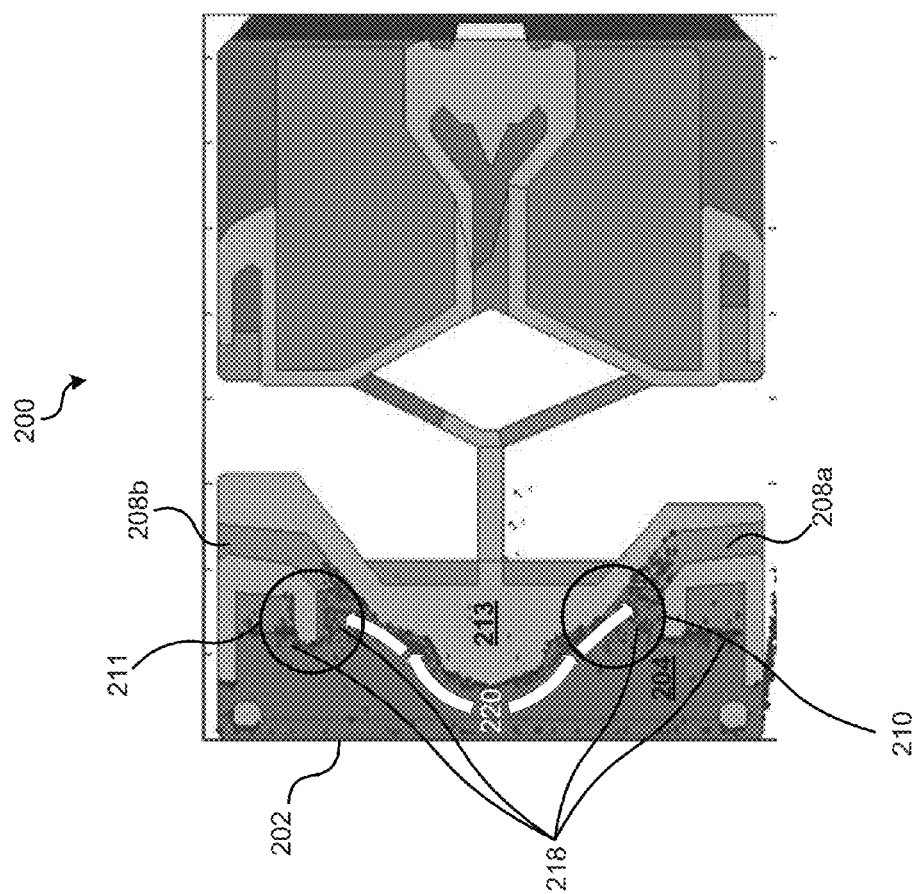
FIG. 4C illustrates a third example progression of particulate flow from a bottom view perspective of the magnetic read/write head of FIG. 2.
Figure 4D:
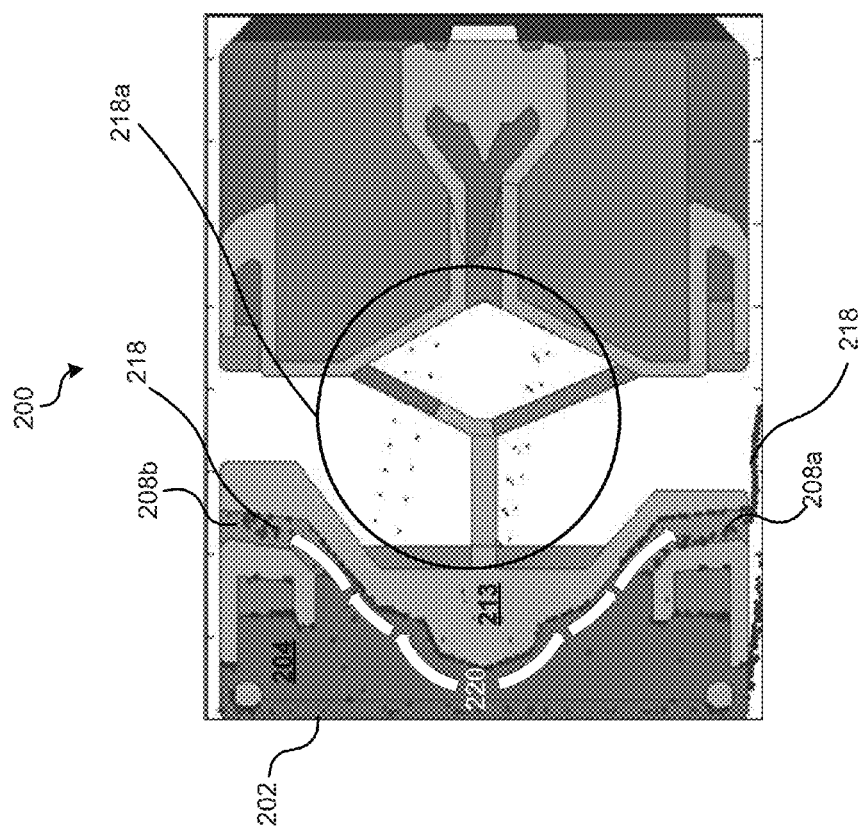
FIG. 4D illustrates a fourth example progression of particulate flow from a bottom view perspective of the magnetic read/write head of FIG. 2.

FIGS. 4A-4D illustrate the movement or progression of particulate matter in an air bearing of a slider (e.g., slider 200) having the aforementioned structural features in accordance with various embodiments. FIG. 4A shows an initial grouping of particulate matter 218 at the leading edge of slider 200. FIG. 4B illustrates that the incoming air flow (as illustrated in FIGS. 3A-3C) begins to force particulate matter 218 into the inlets 210 and 211 in the direction of arrows 220. FIG. 4C illustrates that particulate matter 218 continues to be directed through inlets 210 and 211 in the direction of arrows 220 and begin to enter channels 208a and 208b. FIG. 4D illustrates that particulate matter 218 continues to flow through channels 208a and 208b until the particulate matter 218 is expelled from the air bearing of slider 200. It should be noted that some relatively minor traces of particulate matter indicated by 218a may pass through into the air bearing of slider 200. In general, and in accordance with various embodiments, particle removal efficiency may be between approximately 10 to 40% (e.g., approximately 10 to 40% of particles that find their way into the air bearing can be expelled), and may further be dependent upon the particular dimensions/depth/shape of channels 208a and 208b.

Various embodiments provide an easy and convenient mechanism that allows ABS designers to avoid the problems associated with particle contamination. Because the aforementioned structure ABS features eliminate or at least reduce the opportunity for particles to interact with the ABS, that chance for failure of the HDD and/or damage caused by the particles is also eliminated or at least reduced. Particle contamination has been a long time issue that impacts the reliable operation of the hard drives. Therefore, elimination of particles in the head/disk interface area reduces many reliability problems, such as abrasive wear and scratch on a disk surface, magnetic spacing modulation, unstable flying and even crash of the slider, etc.

For example, particles flowing into the path of the slider 200 as the slider moves over the media 16 are redirected to the edges of the slider 200, thus reducing the risk of particles damaging the magnetic transducer 206. It should be noted that although various embodiments disclosed herein have been described in the context of magnetic recording media, various embodiments can be adapted for use with other forms of media, e.g., magneto-optical disks, optical disks, etc.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration. Moreover, the dimensions in these diagrams and illustrations are not necessarily drawn to scale.

What is claimed is:

1. A slider, comprising:
   a leading edge and a trailing edge;
   a transducer proximate to the trailing edge for performing read and write operations on a recording medium;
   a leading area etched to a first depth and configured to direct incoming airflow into the leading edge towards the trailing edge;
   a first channel; and
   a second channel, wherein the first and second channels are connected to the leading area via respective inlets from the leading area;
   wherein the first and second channels are etched to a second depth deeper than the first depth.

2. The slider of claim 1, wherein the slider is one of a pemto type slider or a femto type slider.

3. The slider of claim 1, wherein the first depth comprises a depth ranging from approximately 0.1-0.2 μm.

4. The slider of claim 1, wherein the second depth comprises a depth ranging from approximately 0.4-1.0 μm.

5. The slider of claim 1, wherein the first channel directs at least a first portion of the incoming airflow from the leading area to exit from an air bearing formed between the slider and the recording medium at an inner diameter radial area of the recording medium over which the slider is positioned.

6. The slider of claim 5, wherein the second channel directs at least a second portion of the incoming airflow from the leading area to exit from an air bearing formed between the slider and the recording medium at an outer diameter radial area of the recording medium over which the slider is positioned.

7. The slider of claim 1, wherein at least one respective portion of each of the first and second channels proximate to the respective inlets is angularly configured towards respective sides of the slider.

8. A disk drive, comprising:
   rotatable recording medium;
   a longitudinal slider having a leading edge and a trailing edge, a bottom surface of the longitudinal slider proximate to the rotatable recording medium defining an air bearing surface;
   a transducer proximate to the trailing edge for performing read and write operations on the rotatable recording medium;
   a fence proximate to and substantially parallel to the leading edge;
   a first channel; and
   a second channel, wherein the first and second channels are positioned on an outer edge of the fence proximate to the leading edge;
   wherein the first and second channels are connected to a leading area etched to a first depth between the leading edge and the fence via respective inlets from the leading area;
   wherein the first and second channels are etched to a second depth deeper than the first depth.

9. The disk drive of claim 8, wherein the first depth comprises a depth ranging from approximately 0.1-0.2 μm.

10. The disk drive of claim 8, wherein the second depth comprises a depth ranging from approximately 0.4-1.0 μm.

11. The disk drive of claim 8, wherein the first channel directs at least a first portion of incoming airflow from the leading area to exit the air bearing surface at an inner diameter of the rotatable recording medium.

12. The disk drive of claim 11, wherein the second channel directs at least a second portion of the incoming airflow from the leading area to exit the air bearing surface at an outer diameter of the rotatable recording medium.

13. The disk drive of claim 8, wherein at least one respective portion of each of the first and second channels proximate to the respective inlets is angularly configured towards respective sides of the longitudinal slider.

14. A disk drive, comprising:
   a recording medium;
   an actuator;
   a suspension mounted to an arm of the actuator; and
   a slider bonded to the suspension, the slider having a leading area etched to a first depth, wherein the slider carries a read/write head configured to radially fly over a surface of the recording medium and is configured with at least two particulate-channeling elements for directing air flow used to redirect particulate matter away from an air bearing surface defined by a bottom surface of the slider through the entire radius of the recording medium;
   wherein the two particulate-channeling elements are etched to a second depth deeper than the first depth between the leading area proximate to a leading edge of the slider.

15. The disk drive of claim 14, further comprising a fence positioned substantially parallel to the leading edge.

* * * * *